(12) United States Patent
Nakashima et al.

(10) Patent No.: US 12,208,807 B2
(45) Date of Patent: Jan. 28, 2025

(54) INFORMATION PROCESSING APPARATUS, METHOD, AND NON-TRANSITORY COMPUTER READABLE MEDIUM FOR GRANTING AN INCENTIVE TO SHARE VEHICLE HISTORY

(71) Applicant: TOYOTA JIDOSHA KABUSHIKI KAISHA, Toyota (JP)

(72) Inventors: Toyokazu Nakashima, Nagoya (JP); Takeshi Takemoto, Nagoya (JP); Naoko Yamafuji, Nagoya (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 17/869,498

(22) Filed: Jul. 20, 2022

(65) Prior Publication Data

US 2023/0040009 A1 Feb. 9, 2023

(30) Foreign Application Priority Data

Aug. 3, 2021 (JP) .................................. 2021-127804

(51) Int. Cl.
*B60W 40/09* (2012.01)
*B60W 40/08* (2012.01)
*G06Q 30/0207* (2023.01)

(52) U.S. Cl.
CPC ......... *B60W 40/09* (2013.01); *G06Q 30/0207* (2013.01); *B60W 2040/0809* (2013.01); *B60W 2540/045* (2020.02); *B60W 2540/215* (2020.02); *B60W 2540/30* (2013.01); *B60W 2556/10* (2020.02)

(58) Field of Classification Search
None
See application file for complete search history.

(56) References Cited

U.S. PATENT DOCUMENTS

| | | | |
|---|---|---|---|
| 11,590,427 B1* | 2/2023 | Kim .................. | A63F 13/46 |
| 2002/0032626 A1* | 3/2002 | DeWolf ............... | G06Q 30/06 |
| | | | 705/36 R |
| 2012/0179517 A1* | 7/2012 | Tang .................. | G06Q 30/0185 |
| | | | 705/318 |
| 2014/0279420 A1* | 9/2014 | Okerlund ............ | G06Q 20/387 |
| | | | 705/39 |
| 2015/0149266 A1* | 5/2015 | Inuzuka ............. | G06Q 30/0212 |
| | | | 705/14.14 |
| 2020/0042727 A1 | 2/2020 | Ogura et al. | |

FOREIGN PATENT DOCUMENTS

JP 2020-024511 A 2/2020

* cited by examiner

*Primary Examiner* — Todd Melton
(74) *Attorney, Agent, or Firm* — Oliff PLC

(57) ABSTRACT

A controller of an information processing apparatus acquires, in a case in which a previous user of a vehicle has not given consent to disclose history data for the vehicle, information indicating whether a current user of the vehicle has given consent to disclose the history data for the vehicle, and determines to grant the current user an incentive in a case in which it is determined, based on the acquired information, that the current user has given consent to disclose the history data for the vehicle.

17 Claims, 3 Drawing Sheets

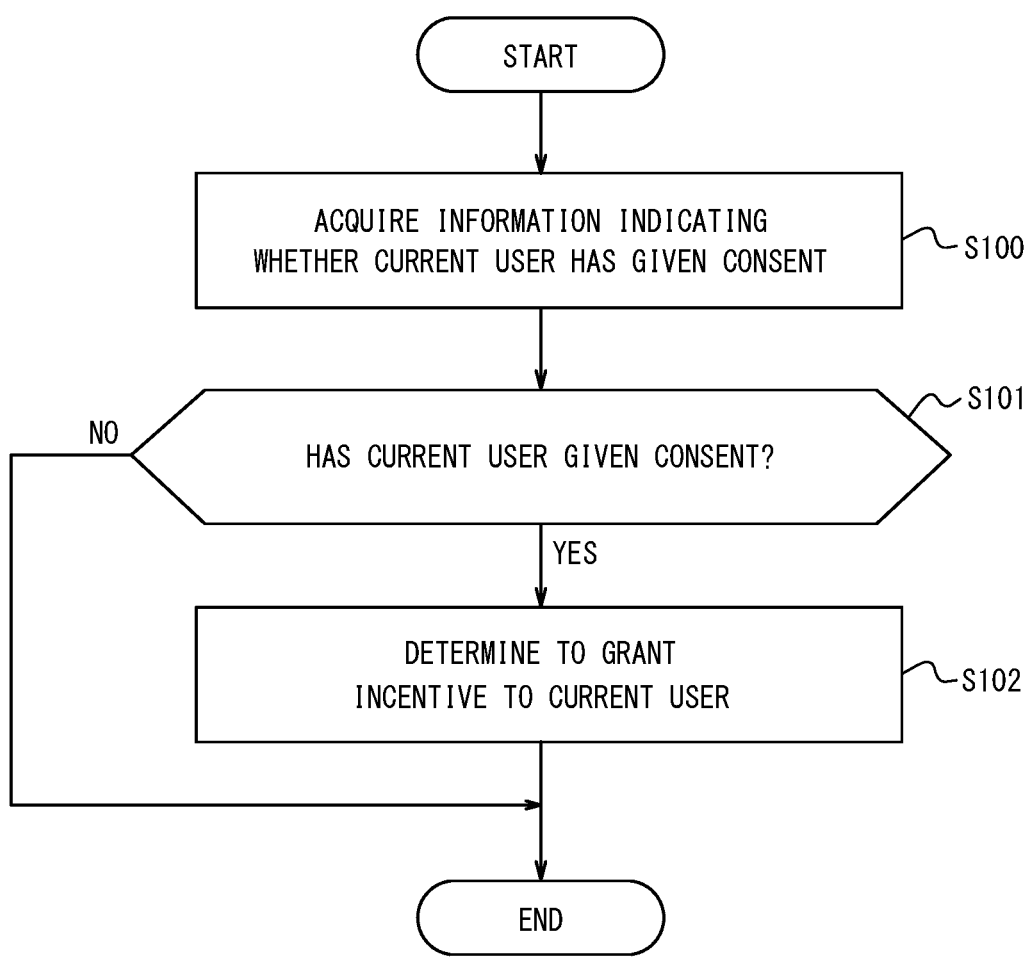

INFORMATION PROCESSING APPARATUS, METHOD, AND NON-TRANSITORY COMPUTER READABLE MEDIUM FOR GRANTING AN INCENTIVE TO SHARE VEHICLE HISTORY

CROSS-REFERENCE TO RELATED APPLICATION

This application claims priority to Japanese Patent Application No. 2021-127804 filed on Aug. 3, 2021, the entire contents of which are incorporated herein by reference.

TECHNICAL FIELD

The present disclosure relates to an information processing apparatus, a method, and a program.

BACKGROUND

Technology related to consent procedures for users is known. For example, Patent Literature (PTL) 1 discloses technology for reducing consent procedures for users.

CITATION LIST

Patent Literature

PTL 1: JP 2020-024511 A

SUMMARY

Technology related to consent procedures for users has room for improvement.

It would be helpful to improve technology related to consent procedures for users.

An information processing apparatus according to an embodiment of the present disclosure includes a controller configured to:
acquire, in a case in which a previous user of a vehicle has not given consent to disclose history data for the vehicle, information indicating whether a current user of the vehicle has given consent to disclose the history data for the vehicle; and
determine to grant the current user an incentive in a case in which it is determined, based on the acquired information, that the current user has given consent to disclose the history data for the vehicle.

A method according to an embodiment of the present disclosure is a method to be executed by an information processing apparatus, the method including:
acquiring, in a case in which a previous user of a vehicle has not given consent to disclose history data for the vehicle, information indicating whether a current user of the vehicle has given consent to disclose the history data for the vehicle; and
determining to grant the current user an incentive in a case in which it is determined, based on the acquired information, that the current user has given consent to disclose the history data for the vehicle.

A program according to an embodiment of the present disclosure causes a computer to execute operations, the operations including:
acquiring, in a case in which a previous user of a vehicle has not given consent to disclose history data for the vehicle, information indicating whether a current user of the vehicle has given consent to disclose the history data for the vehicle; and
determining to grant the current user an incentive in a case in which it is determined, based on the acquired information, that the current user has given consent to disclose the history data for the vehicle.

According to an embodiment of the present disclosure, technology related to consent procedures for users can be improved.

BRIEF DESCRIPTION OF THE DRAWINGS

In the accompanying drawings:
FIG. 3 is a flowchart illustrating operations of an information processing apparatus according to an embodiment of the present disclosure.

DETAILED DESCRIPTION

Hereinafter, an embodiment of the present disclosure will be described.

Figure 1:
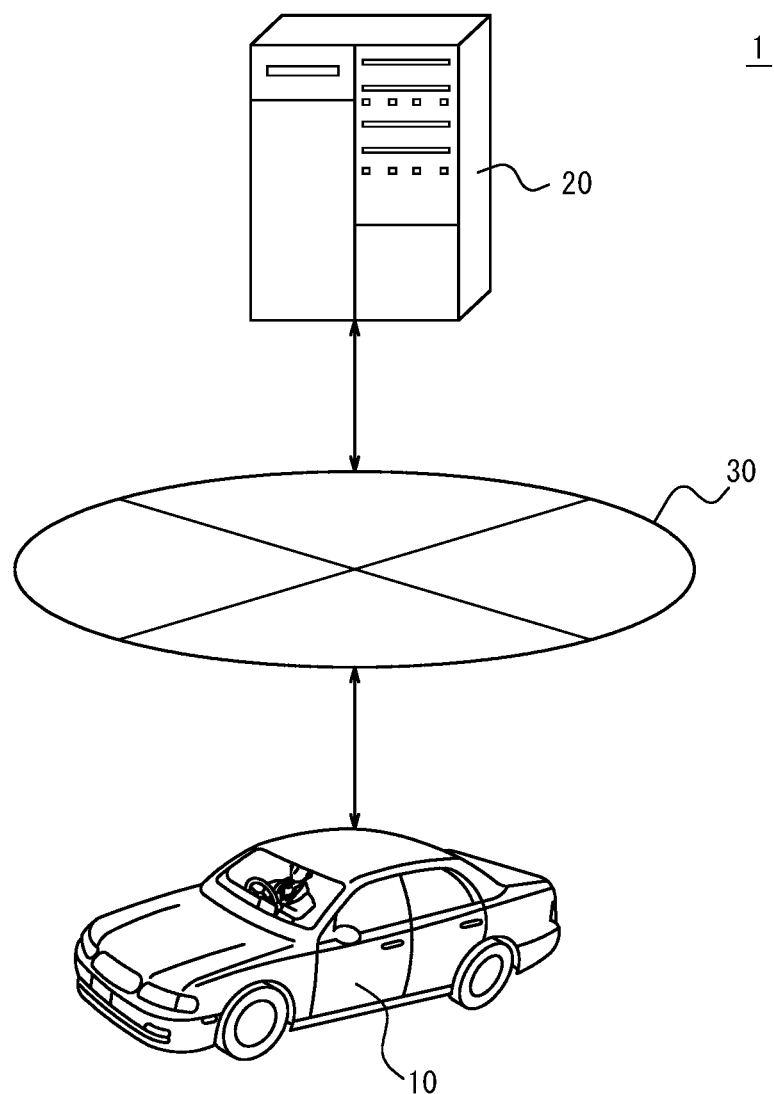
FIG. 1 is a block diagram illustrating a schematic configuration of a system according to an embodiment of the present disclosure.

An outline of a system 1 according to an embodiment of the present disclosure will be described with reference to FIG. 1.

The system 1 includes a vehicle 10 and an information processing apparatus 20. The vehicle 10 and the information processing apparatus 20 are communicably connected to a network 30.

The vehicle 10 is an automobile, for example, but is not limited to this, and may be any appropriate vehicle. The automobile is, for example, a gasoline vehicle, a battery electric vehicle (BEV), a hybrid electric vehicle (HEV), a plug-in hybrid electric vehicle (PHEV), a fuel cell electric vehicle (FCEV), or the like, but is not limited to these. The vehicle 10 may be driven by a driver, or the driving may be automated at any level. The level of automation is, for example, one of level 1 to level 5 according to the classification of the Society of Automotive Engineers (SAE). The vehicle 10 may be a dedicated Mobility as a Service (MaaS) vehicle.

The information processing apparatus 20 is a computer such as a server that belongs to a cloud computing system or another type of computing system.

The network 30 includes the Internet, at least one wide area network (WAN), at least one metropolitan area network (MAN), or any combination thereof. The network 40 may include at least one wireless network, at least one optical network, or any combination thereof. The wireless network is, for example, an ad hoc network, a cellular network, a wireless local area network (LAN), a satellite communication network, or a terrestrial microwave network.

An outline of the present embodiment will be described with reference to FIG. 1.

The controller 21 of the information processing apparatus 20 acquires, in a case in which a previous user U1 of the vehicle 10 has not given consent to disclose the history data for the vehicle 10, information indicating whether a current user U2 of the vehicle 10 has given consent to disclose the history data for the vehicle 10. The controller 21 of the information processing apparatus 20 then determines to grant the current user U2 an incentive in a case in which it is determined, based on the acquired information, that the current user U2 has given consent to disclose the history data for the vehicle 10.

According to the present embodiment, even in a case in which the previous user U1 has not given consent to disclose the history data for the vehicle 10, the current user U2 can be encouraged, via the granting of an incentive, to disclose the history data for the vehicle 10. Even in a case in which the history data for the vehicle 10 pertaining to use of the vehicle 10 by the previous user U1 cannot be ascertained, this configuration enables the history data for the vehicle 10 pertaining to use of the vehicle 10 by the current user U2 to be ascertained, thereby controlling a decrease in the value of the vehicle 10. Therefore, technology related to consent procedures for users can be improved.

Figure 2:
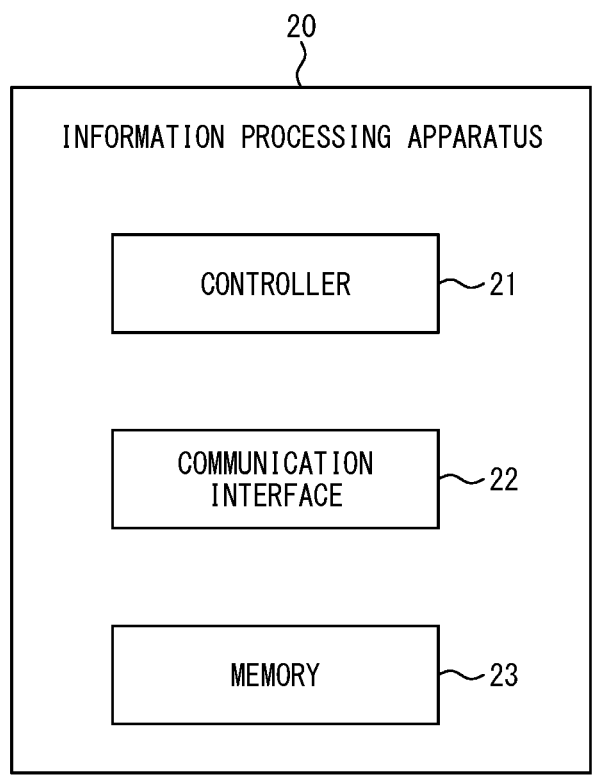
FIG. 2 is a block diagram illustrating a schematic configuration of an information processing apparatus according to an embodiment of the present disclosure.

A configuration of the information processing apparatus 20 according to the present embodiment will be described with reference to FIG. 2.

The information processing apparatus 20 includes the controller 21, a communication interface 22, and a memory 23.

The controller 21 includes at least one processor, at least one programmable circuit, at least one dedicated circuit, or any combination thereof. The processor is a general purpose processor such as a Central Processing Unit (CPU) or a Graphics Processing Unit (GPU), or a dedicated processor that is dedicated to specific processing. The programmable circuit is, for example, a field-programmable gate array (FPGA). The dedicated circuit is, for example, an application specific integrated circuit (ASIC). The controller 21 executes processes related to operations of the information processing apparatus 20 while controlling components of the information processing apparatus 20.

The communication interface 22 includes at least one interface for communication. The interface for communication is compliant with, for example, a mobile communication standard, a wired LAN standard, or a wireless LAN standard, but not limited to these, and may be compliant with any communication standard. The communication interface 22 receives data to be used for the operations of the information processing apparatus 20, and transmits data obtained by the operations of the information processing apparatus 20.

The memory 23 includes at least one semiconductor memory, at least one magnetic memory, at least one optical memory, or any combination thereof. The semiconductor memory is, for example, Random Access Memory (RAM) or Read Only Memory (ROM). The RAM is, for example, Static Random Access Memory (SRAM) or Dynamic Random Access Memory (DRAM). The ROM is, for example, Electrically Erasable Programmable Read Only Memory (EEPROM). The memory 23 functions as, for example, a main memory, an auxiliary memory, or a cache memory. The memory 23 stores data to be used for the operations of the information processing apparatus 20 and data obtained by the operations of the information processing apparatus 20.

Operations of the information processing apparatus 20 according to the present embodiment will be described with reference to FIG. 3. These operations correspond to a method according to an embodiment of the present disclosure.

The present embodiment describes a case in which the previous user U1 of the vehicle 10 sells the vehicle 10 without having given consent to disclose the history data for the vehicle 10, and the current user U2 purchases the vehicle 10 as a used vehicle. However, the present disclosure is not limited to this case.

The history data for the vehicle 10 includes, for example, data on the distance traveled, data on the usage status, data on the failure status, or data on the maintenance status, and is acquired by any appropriate method from the vehicle 10. The data indicating the distance traveled may include any data used to evaluate the distance traveled by the vehicle 10 and may include time-series data such as the distance traveled, speed, acceleration, or travel time of the vehicle 10. The data on the usage status includes any data used to evaluate the usage status of the vehicle 10 and may include time-series data such as the engine on/off status of the vehicle 10, the operation history of the accelerator, the operation history of the brakes, the operation history of the steering wheel, the fuel level, or the battery level. The data on the failure status includes any data used to evaluate the failure status of the vehicle 10 and may include the history of impacts received by the vehicle 10, a failure history generated by an in-vehicle failure diagnostic device, the failure/error history of in-vehicle equipment, and the like. The data on the maintenance status includes any data used to evaluate the maintenance status of the vehicle 10 and may include the installation history, the replacement history, or the like of the in-vehicle equipment in the vehicle 10. From the standpoint of personal information protection, the history data for the vehicle 10 is disclosed, including the disclosure, provision, or the like of the history data for the vehicle 10 to a third party, in the case in which consent is given. It is assumed that information indicating that the previous user U1 of the vehicle 10 has not given consent to disclose the history data for the vehicle 10 is acquired in advance via the communication interface 22 and stored in advance in the memory 23 so that the controller 21 of the information processing apparatus 20 can refer to the information in performing step S100, described below.

Step S100: The controller 21 of the information processing apparatus 20 acquires, in a case in which a previous user U1 has not given consent to disclose the history data for the vehicle 10, information indicating whether the current user U2 has given consent to disclose the history data for the vehicle 10.

Specifically, the dealer of the vehicle 10 transmits information indicating whether the current user U2 has given consent to disclose the history data for the vehicle 10 to the information processing apparatus 20 via a shop terminal installed in a shop. In a case in which it is determined by referring to the memory 23 that the previous user U1 has not given consent to disclose the history data for the vehicle 10, the controller 21 of the information processing apparatus 20 acquires, from the shop terminal via the communication interface 22, information indicating whether the current user U2 has given consent to disclose the history data for the vehicle 10. However, the method of acquiring information indicating whether the consent was given is not limited to this example. For example, the information indicating whether the consent was given may be acquired from a car navigation device mounted in the vehicle 10 or via a user terminal, such as a smartphone, owned by the current user U2.

Step S101: The controller 21 of the information processing apparatus 20 determines whether the current user U2 has given consent to disclose the history data for the vehicle 10 based on the information, acquired in step S100, indicating whether the current user U2 has given consent to disclose the history data for the vehicle 10. In a case in which it is determined that the consent was given, the process proceeds to step S102. Conversely, in a case in which it is determined that the consent was not given, the process ends.

In step S101, in the case in which it is determined that the consent was not given, the controller 21 of the information processing apparatus 20 may output a notification, by a screen display on a user terminal owned by the current user U2 or by audio, for example, prompting the current user U2 to consent to disclose the history data for the vehicle 10. The notification prompting for consent to disclose the history data for the vehicle 10 may include information suggesting that an incentive will be granted if the current user U2 consents to disclose the history data for the vehicle 10.

Step S102: The controller 21 of the information processing apparatus 20 determines to grant an incentive to the current user U2.

Specifically, the controller 21 of the information processing apparatus 20 determines to grant an incentive to the current user U2. The controller 21 of the information processing apparatus 20 then transmits, via the communication interface 22, information indicating the result of this determination, together with identification information, acquired by any method, for the user terminal owned by the current user U2, to the shop terminal owned by the maintenance contractor, dealer, or the like of the vehicle 10. The current user U2 then receives an incentive by reading a one-dimensional or two-dimensional code or the like, displayed on the screen of the shop terminal, via a camera built into or connected to the user terminal.

The incentive may, for example, include a discount on costs related to maintenance of the vehicle 10, the discount being usable when the current user U2 has maintenance performed on the vehicle 10 at a shop where the history data for the vehicle 10 can be acquired. The incentive may, for example, include a predetermined coupon or points usable by the current user U2 to purchase certain products or to receive certain services at a shop operated by an entity such as the dealer of the vehicle 10.

Here, in step S104, the controller 21 of the information processing apparatus 20 may determine to grant more of the incentive as the count of past users of the vehicle 10 who have not given consent to disclose the history data for the vehicle 10 is lower. Specifically, one or multiple levels of thresholds may be set with respect to the count of past users of the vehicle 10. As a non-limiting example, the controller 21 of the information processing apparatus 20 may determine the granting rate of the incentive to be a first granting rate in a case in which the count of past users of the vehicle 10 who have not given consent to disclose the history data for the vehicle 10 is less than a first threshold, determine the granting rate of the incentive to be a second granting rate in a case in which the count of past users of the vehicle 10 who have not given consent to disclose the history data for the vehicle 10 is equal to or greater than the first threshold but less than a second threshold, and determine the granting rate of the incentive to be a third granting rate in a case in which the count of past users of the vehicle 10 who have not given consent to disclose the history data for the vehicle 10 is equal to or greater than the second threshold. The controller 21 of the information processing apparatus 20 may set the first through third granting rates as appropriate to decrease in this order. It suffices for information indicating the count of past users of the vehicle 10 who have not given consent to disclose the history data for the vehicle 10 to be acquired in advance via the communication interface 22 and stored in advance in the memory 23 so that the controller 21 of the information processing apparatus 20 can refer to the information in performing this step.

In step S102, the controller 21 of the information processing apparatus 20 may determine to grant more of incentive in a case in which the user of the vehicle 10 previous to the previous user has given consent to disclose the history data for the vehicle 10 than in a case in which the user previous to the previous user has not given consent to disclose the history data for the vehicle 10. It suffices for information indicating whether the user of the vehicle 10 previous to the previous user has given consent to disclose the history data for the vehicle 10 to be acquired in advance via the communication interface 22 and stored in advance in the memory 23 so that the controller 21 of the information processing apparatus 20 can refer to the information in performing this step.

In step S102, the controller 21 of the information processing apparatus 20 may determine a granting rate of the incentive according to a degree of limiting of a reduction in price of the vehicle 10 due to a past user before the previous user U1 having given consent to disclose the history data for the vehicle 10 as compared to a case in which the past user has not given the consent. Specifically, one or multiple levels of thresholds may be set with respect to the degree of limiting of the reduction in price of the vehicle 10. As a non-limiting example, the controller 21 of the information processing apparatus 20 may determine the granting rate of the incentive to be a first granting rate in a case in which the degree of limiting of the reduction in price of the vehicle 10 is less than a first threshold, determine the granting rate of the incentive to be a second granting rate in a case in which the degree of limiting of the reduction in price of the vehicle 10 is equal to or greater than the first threshold but less than a second threshold, and determine the granting rate of the incentive to be a third granting rate in a case in which the degree of limiting of the reduction in price of the vehicle 10 is equal to or greater than the second threshold. The controller 21 of the information processing apparatus 20 may set the first through third granting rates as appropriate to increase in this order. It suffices for the degree of limiting of the reduction in price of the vehicle 10 to be acquired in advance via the communication interface 22 and stored in advance in the memory 23 so that the controller 21 of the information processing apparatus 20 can refer to the degree of limiting in performing this step.

In step S102, the controller 21 of the information processing apparatus 20 may determine the granting rate of the incentive according to the age of the vehicle 10. Specifically, one or multiple levels of thresholds may be set with respect to the age of the vehicle 10. As a non-limiting example, the controller 21 of the information processing apparatus 20 may determine the granting rate of the incentive to be a first granting rate in a case in which the age of the vehicle 10 is less than a first threshold, determine the granting rate of the incentive to be a second granting rate in a case in which the age of the vehicle 10 is equal to or greater than the first threshold but less than a second threshold, and determine the granting rate of the incentive to be a third granting rate in a case in which the age of the vehicle 10 is equal to or greater than the second threshold. The controller 21 of the information processing apparatus 20 may set the first through third granting rates as appropriate to decrease in this order. It suffices for information indicating the age of the vehicle 10 to be acquired in advance via the communication interface 22 and stored in advance in the memory 23 so that the controller 21 of the information processing apparatus 20 can refer to the information in performing this step.

In a case in which a past user of vehicle 10 had an accident with vehicle 10, the price of vehicle 10 will typically decrease. However, in a case in which the past user of the vehicle 10 has given consent to disclose the history data for the vehicle 10, and proper maintenance and the like has been performed on the vehicle 10, the reduction in price of the vehicle 10 can sometimes be limited. Therefore, in step S102, the controller 21 of the information processing apparatus 20 may determine the granting rate of the incentive according to a degree of limiting of the reduction in price of the vehicle 10 for the current user U2 who purchases such a vehicle 10. Specifically, one or multiple levels of thresholds may be set with respect to the degree of limiting of the reduction in price of the vehicle 10. As a non-limiting example, the controller 21 of the information processing apparatus 20 may determine the granting rate of the incentive to be a first granting rate in a case in which the degree of limiting of the reduction in price of the vehicle 10 is less than a first threshold, determine the granting rate of the incentive to be a second granting rate in a case in which the degree of limiting of the reduction in price of the vehicle 10 is equal to or greater than the first threshold but less than a second threshold, and determine the granting rate of the incentive to be a third granting rate in a case in which the degree of limiting of the reduction in price of the vehicle 10 is equal to or greater than the second threshold. The controller 21 of the information processing apparatus 20 may set the first through third granting rates as appropriate to increase in this order. It suffices for the degree of limiting of the reduction in price of the vehicle 10 to be acquired in advance via the communication interface 22 and stored in advance in the memory 23 so that the controller 21 of the information processing apparatus 20 can refer to the degree of limiting in performing this step.

As described above, the controller 21 of the information processing apparatus 20 according to the present embodiment acquires, in a case in which a previous user U1 of the vehicle 10 has not given consent to disclose the history data for the vehicle 10, information indicating whether a current user U2 of the vehicle 10 has given consent to disclose the history data for the vehicle 10. The controller 21 of the information processing apparatus 20 then determines to grant the current user U2 an incentive in a case in which it is determined, based on the acquired information, that the current user U2 has given consent to disclose the history data for the vehicle 10.

According to this configuration, even in a case in which the previous user U1 has not given consent to disclose the history data for the vehicle 10, the current user U2 can be encouraged, via the granting of an incentive, to disclose the history data for the vehicle 10. Even in a case in which the history data for the vehicle 10 pertaining to use of the vehicle 10 by the previous user U1 cannot be ascertained, this configuration enables the history data for the vehicle 10 pertaining to use of the vehicle 10 by the current user U2 to be ascertained, thereby controlling a decrease in the value of the vehicle 10. Therefore, technology related to consent procedures for users can be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

As a variation, an embodiment in which the configuration and operations of the information processing apparatus 20 are distributed to multiple computers capable of communicating with each other can be implemented. For example, an embodiment in which some or all of the components of the information processing apparatus 20 are provided in the vehicle 10 can also be implemented. For example, a car navigation device mounted in the vehicle 10 may include some or all of the components of the information processing apparatus 20.

As a variation, an embodiment in which a general purpose computer functions as the information processing apparatus 20 according to the above embodiment can also be implemented. Specifically, a program in which processes for realizing the functions of the information processing apparatus 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An information processing apparatus comprising a controller configured to:
   acquire, in a case in which a previous user of a vehicle has not given consent to disclose history data for the vehicle, information indicating whether a current user of the vehicle has given consent to disclose the history data for the vehicle, the history data including at least data on distance traveled by the vehicle, and maintenance status information of the vehicle;
   output a notification to a terminal device prompting the current user to consent to disclose the history data for the vehicle, in a case in which it is determined that the current user has not given consent to disclose the history data for the vehicle, the notification including information on an incentive to be granted to the current user if the history data is disclosed;
   determine to grant the current user the incentive in a case in which it is determined, based on the acquired information, that the current user has given consent to disclose the history data for the vehicle; and
   transmit information regarding the incentive to another terminal device in the case in which it is determined that the current user has given consent to disclose the history data.

2. The information processing apparatus according to claim 1, wherein the controller determines to grant more of the incentive as a count of past users of the vehicle who have not given consent to disclose the history data for the vehicle is lower.

3. The information processing apparatus according to claim 1, wherein the controller determines to grant more of the incentive in a case in which a user of the vehicle previous to the previous user has given consent to disclose the history data for the vehicle than in a case in which the user previous to the previous user has not given consent to disclose the history data for the vehicle.

4. The information processing apparatus according to claim 1, wherein the controller determines a granting rate of the incentive according to a degree of limiting of a reduction in price of the vehicle due to a past user before the previous user having given consent to disclose the history data for the vehicle as compared to a case in which the past user has not given consent.

5. The information processing apparatus according to claim 1, wherein the controller determines a granting rate of the incentive according to an age of the vehicle.

6. The information processing apparatus according to claim 1, wherein the incentive includes a discount on costs related to maintenance of the vehicle or includes a predetermined coupon or points.

7. A method to be executed by an information processing apparatus, the method comprising:
- acquiring, in a case in which a previous user of a vehicle has not given consent to disclose history data for the vehicle, information indicating whether a current user of the vehicle has given consent to disclose the history data for the vehicle, the history data including at least data on distance traveled by the vehicle, and maintenance status information of the vehicle;
- outputting a notification to a terminal device prompting the current user to consent to disclose the history data for the vehicle, in a case in which it is determined that the current user has not given consent to disclose the history data for the vehicle, the notification including information on an incentive to be granted to the current user if the history data is disclosed;
- determining to grant the current user the incentive in a case in which it is determined, based on the acquired information, that the current user has given consent to disclose the history data for the vehicle; and
- transmitting information regarding the incentive to another terminal device in the case in which it is determined that the current user has given consent to disclose the history data.

8. The method according to claim 7, further comprising determining to grant more of the incentive as a count of past users of the vehicle who have not given consent to disclose the history data for the vehicle is lower.

9. The method according to claim 7, further comprising determining to grant more of the incentive in a case in which a user of the vehicle previous to the previous user has given consent to disclose the history data for the vehicle than in a case in which the user previous to the previous user has not given consent to disclose the history data for the vehicle.

10. The method according to claim 7, further comprising determining a granting rate of the incentive according to a degree of limiting of a reduction in price of the vehicle due to a past user before the previous user having given consent to disclose the history data for the vehicle as compared to a case in which the past user has not given consent.

11. The method according to claim 7, further comprising determining a granting rate of the incentive according to an age of the vehicle.

12. The method according to claim 7, wherein the incentive includes a discount on costs related to maintenance of the vehicle or includes a predetermined coupon or points.

13. A non-transitory computer readable medium storing a program configured to cause a computer to execute operations, the operations comprising:
- acquiring, in a case in which a previous user of a vehicle has not given consent to disclose history data for the vehicle, information indicating whether a current user of the vehicle has given consent to disclose the history data for the vehicle, the history data including at least data on distance traveled by the vehicle, and maintenance status information of the vehicle;
- outputting a notification to a terminal device prompting the current user to consent to disclose the history data for the vehicle, in a case in which it is determined that the current user has not given consent to disclose the history data for the vehicle, the notification including information on an incentive to be granted to the current user if the history data is disclosed;
- determining to grant the current user the incentive in a case in which it is determined, based on the acquired information, that the current user has given consent to disclose the history data for the vehicle; and
- transmitting information regarding the incentive to another terminal device in the case in which it is determined that the current user has given consent to disclose the history data.

14. The non-transitory computer readable medium according to claim 13, wherein the operations further comprise determining to grant more of the incentive as a count of past users of the vehicle who have not given consent to disclose the history data for the vehicle is lower.

15. The non-transitory computer readable medium according to claim 13, wherein the operations further comprise determining to grant more of the incentive in a case in which a user of the vehicle previous to the previous user has given consent to disclose the history data for the vehicle than in a case in which the user previous to the previous user has not given consent to disclose the history data for the vehicle.

16. The non-transitory computer readable medium according to claim 13, wherein the operations further comprise determining a granting rate of the incentive according to a degree of limiting of a reduction in price of the vehicle due to a past user before the previous user having given consent to disclose the history data for the vehicle as compared to a case in which the past user has not given consent.

17. The non-transitory computer readable medium according to claim 13, wherein the incentive includes a discount on costs related to maintenance of the vehicle or includes a predetermined coupon or points.

* * * * *